Feb. 24, 1970  J. SUNNEN  3,496,758
BORE GAGE SETTING FIXTURE
Filed Jan. 31, 1968  2 Sheets-Sheet 2

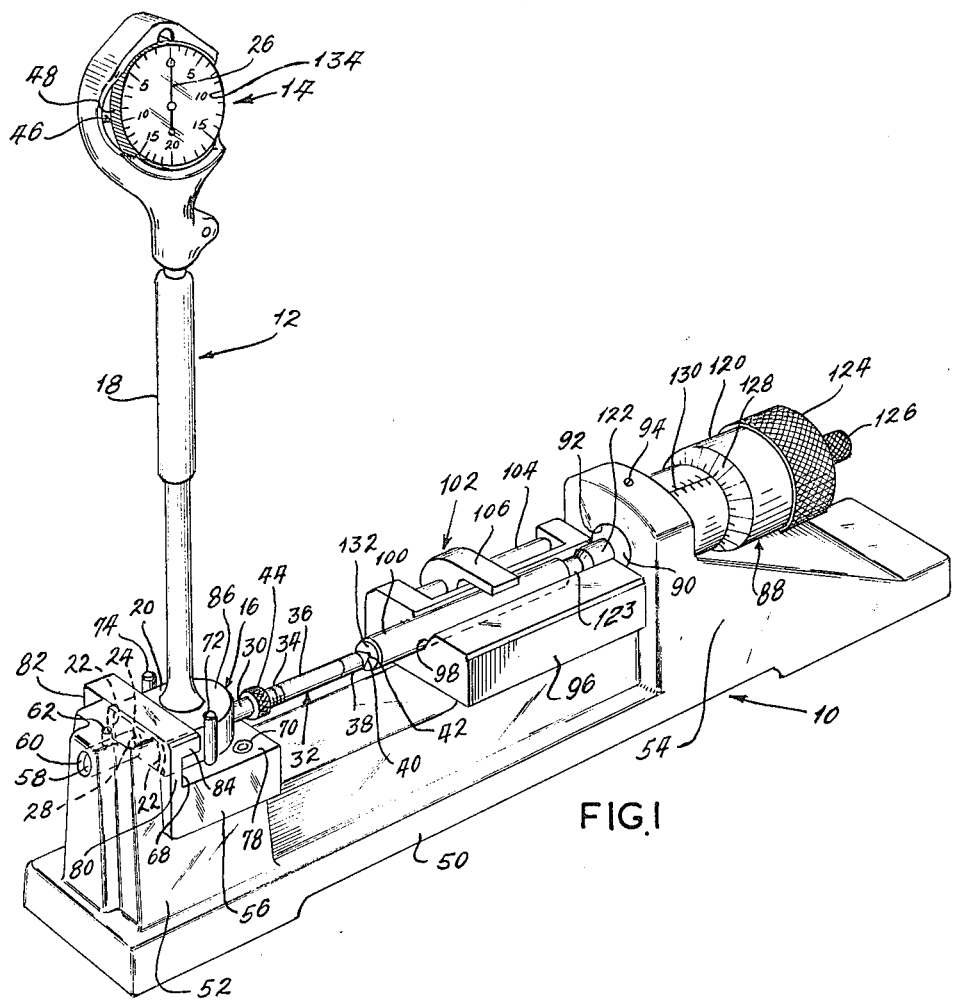
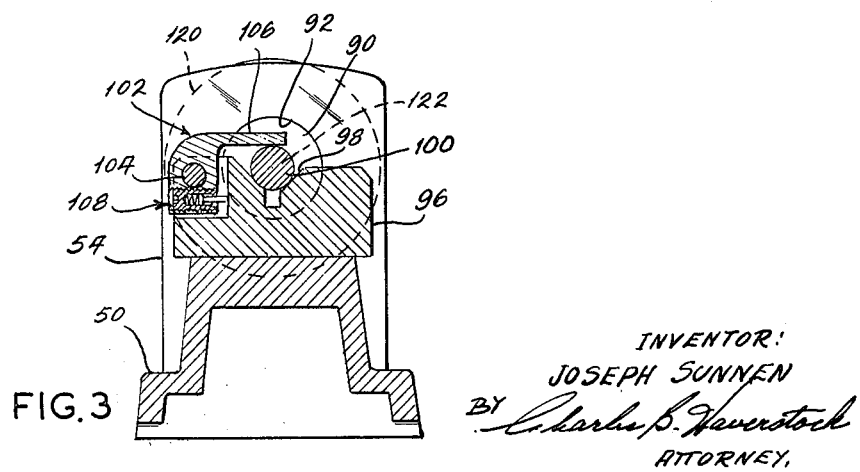

INVENTOR:
JOSEPH SUNNEN
BY Charles B. Wavretck
ATTORNEY,

United States Patent Office 3,496,758
Patented Feb. 24, 1970

3,496,758
BORE GAGE SETTING FIXTURE
Joseph Sunnen, 400 S. Warson Road, Ladue, Mo. 63124
Filed Jan. 31, 1968, Ser. No. 702,000
Int. Cl. G01c 17/38
U.S. Cl. 73—1
9 Claims

ABSTRACT OF THE DISCLOSURE

A fixture for accurately adjusting or setting a measuring instrument such as a dial bore gage including a structure having spaced portions one of which has a fixed surface thereon and the other an adjustable surface aligned with the fixed surface, the distance between said surfaces being accurately adjustable to any dimension within the range of the fixture, means for mounting and supporting the gaging portion of a gaging instrument to be adjusted so that the instrument gaging surfaces are in alignment between said fixed and adjustable fixture surfaces, the spacing of said gaging surfaces being adjustable to the spacing of the fixed and adjustable fixture surfaces. The subject fixture also includes means for accurately expanding the range of adjustment thereof.

---

The subject invention relates generally to setting fixtures and like devices and more particularly to a fixture for setting distance measuring devices such as dial bore gages used for measuring distance including measuring the diameter and accuracy of cylindrical bores and the like.

Gages such as dial bore gages used for measuring internal diameters and other distances are difficult to accurately adjust and set because there has been no easy, convenient and accurate way to hold and support them while adjusting them, and there has been no way of accurately setting and calibrating them over a wide range of dimensions. This is true in part because the known adjustment means are limited to one or several particular settings or are limited to a narrow range of accruate setting positions. This presents problems especially as the range and size of setting varies or increases since no known setting fixture retains its accuracy over a wide range, and no known fixture includes means for accurately substantially expanding the adjustment range. The problem of obtaining accurate settings over a wide range is further complicated by the construction of the gages to be set which include dial bore gages that usually have a dial portion at one end of a handle and a gaging portion at the opposite end making them difficult and awkward to hold, support and align while adjusting. This is further aggravated as the dimension to which the gage is to be set increases because for larger settings the gage must be even more accurately held and steadied, and even more accurately positioned relative to the fixture surfaces. As a result the practice most used heretofore to obtain a high degree of dimensional accuracy has been to employ accurately formed but non-adjustable ring gages. The disadvantages of ring gages are obvious especially since they are not adjustable and a separate ring gage is required for each dimension to which a gage is to be set. All other known devices which could be used such as adjustable caliper means and micrometers simply are not accurate enough for many purposes requiring a high degree of precision, and with such devices the gage being set usually cannot be steadied and held accurately enouh relative to the measurement surfaces for the operator to attain the desired setting and setting tolerances. Furthermore, as stated such devices usually have relatively limited accurate adjustment ranges.

These and other disadvantages and limitations of known gage setting and calibrating means are overcome by the present setting fixture which provides means for accurately locating a gage to be set on a setting fixture relative to the fixture setting components. The present device also includes means for accurately changing the fixture setting over a relatively broad range of dimensions. The subject fixture is also relatively simple and inexpensive to construct compared to known means used for the same or similar purposes including known devices used for setting gages such as dial bore gages, it is simple and easy to operate, it is extremly accurate over its entire range of adjustment and the subject fixture can also be relatively easily recalibrated as required to compensate for wear and for other conditions that might cause error. The subject fixture is shown and described in conjunction with a dial bore gage but it is anticipated that it can also be used for many other measuring and setting applications and uses as well.

It is therefore a principal object of the present invention to provide accurate means for adjusting and setting measuring instruments such as dial bore gages and the like.

Another object is to provide means by which a distance measuring device can be accurately adjusted to any dimension within a relatively broad range.

Another object is to provide a relatively inexpensive setting fixture which requires little or no training and experience to operate and use.

Another object is to minimize the time required to accurately adjust and prepare a measuring device such as a bore gage.

Another object is to provide means by which a dial bore gage or like measuring device can be quickly and accurately calibrated throughout its range.

Another object is to increase the range and accuracy to which measuring devices such as bore gages can be set.

Another object is to increase the accurate range of a setting fixture.

Another object is to provide means by which a distance measuring device can easily and accurately be recalibrated to compensate for wear and other conditions which produce error.

Another object is to provide more accurate means for holding and supporting a measuring instrument such as a dial bore gage while adjusting same.

Another object is to provide a setting fixture which can be accurately used to set or adjust many different kinds, sizes and shapes of distance measuring devices including dial bore gages and like devices.

These and other objects and advantages of the present invention will become apparent to those skilled in the art after considering the following detailed specification in conjunction with the accompanying drawings, wherein:

FIG. 1 is a perspective view showing a fixture constructed according to the present invention, said view also showing a gage to be set resting on the fixture;

FIG. 3 is a cross-sectional view taken on line 3—3 of FIG. 2;

Figure 2:
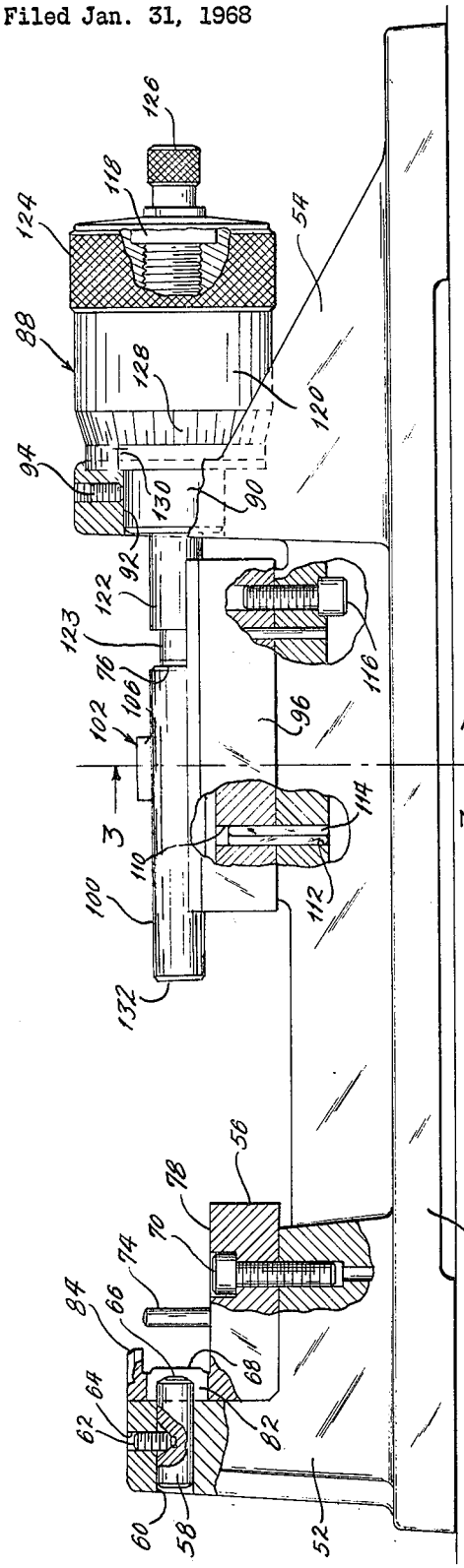
FIG. 2 is a side elevational view, partly in section showing the same setting fixture per se.

Referring to the drawings more particularly by reference numbers, number 10 refers generally to a fixture constructed according to the present invention. The fixture 10 is used for setting gages and like devices such as the dial bore gage 12 shown in FIG. 1. Dial bore gages and other distance measuring devices come in many different sizes and shapes and such gages generally include a dial portion 14 for indicating the accuracy of a measurement, a gaging portion 16 for engaging the work to be measured which portion includes the work engaging members to be adjusted by the present fixture 10, and an elongated handle portion 18 which extends between and is connected to the dial and gaging portions 14 and 16. The gaging portion 16 is the portion of the gage 12 which engages and cooperates with the subject fixture 10 and also with the work to be measured. The gaging portion 16 as shown in FIG. 1 includes a centralizer member 20 which is shaped and of a size to be easily moved into a bore to be gaged. The centralizer 20 is spring biased relative to the gaging portions toward one of the work engaging elements thereof as will be explained, and the centralizer has a pair of spaced centering ribs 22 formed at opposite ends of one side thereof for centering the gaging portion in a bore to be measured in a well known manner. The centering ribs 22 are also preferably rounded from top to bottom so that their centers are their furthest apart portions as shown, and midway between the ribs 22 is a gaging plunger member 24 which is part of the gaging portion 16 and is normally biased outwardly in the gaging portion 16 for engagement with a surface to be measured. The gaging member 24 is also operatively connected through the handle 18 to the dial portion 14 so that when the plunger member 24 moves it will cause a movable dial pointer 26 in the dial portion 14 to rotate in a manner well known to dial bore gages such as the gage 12. The movements of the plunger member 24 thus transmitted to the dial pointer 26 are usually also amplified through suitable linkages now shown. The free outwardly extended end surface 28 of the member 24 forms one of the work engaging surfaces of the gage 12 and the position of the surface 28 is important to the setting and calibrating of the gage as will be explained. The structural details of the gage 12, however, are not part of the present invention and are included only insofar as necessary to a full and complete understanding of the fixture 10.

Extending outwardly from the gaging portion 16 on the opposite side thereof from the movable biased gaging member 24 and in alignment therewith is a fixed internally threaded member 30 which threadedly receives a fixed but adjustable second gaging member 32. The gaging member 32 has a threaded portion 34 on one end which cooperates with the threads in the member 30 and the member 32 also has a shaft portion 36 of predetermined length. The end of the shaft 36 opposite from the threaded portion 34 has an attached end portion 38 with a hardened end 40, the surface of which forms a second work engaging surface 42 on the gage 12. The distance between the work engaging surfaces 28 and 42 on the members 24 and 32, respectively, is the distance that is to be adjusted and set using the fixture 10. One or more lock nuts such as nut 44 are mounted on the threaded portion 34 of the gaging member 32 for locking the member 32 in any adjusted position in the member 30 when the gage is adjusted or calibrated.

The fixture 10 is used to accurately adjust or set the distance between opposed work gaging surfaces 28 and 42 on the members 24 and 32 as aforesaid. This can be done to any dimension over a wide range of dimensions by proper selection of the length of the fixed but adjustable gaging member 32 and by selecting a corresponding length fixture member which will be described later. The gage 12 is usually provided with a plurality of different standard length members 32 so that it can be set to any dimension over a wide range of dimensions depending on the diameter of a bore or other distance to be measured. It is important, however, that the selected length gaging member 32 be able to be quickly and accurately installed and adjusted and the subject fixture provides the means for accomplishing this. It is anticipated that many different measuring and gaging devices in addition to the particular dial bore gage 12 shown can be adjusted and/or calibrated using the present fixture, and the present fixture can also be used as a direct measuring device and for other measuring and setting purposes as well.

The operator using the subject device determines and selects the desired length member 32 depending on the dimension he desires to measure, and he installs the selected member 32 in the member 30 as aforesaid. This initial selection establishes the range of dimensions to which the gage can be set. Once this is done the gage is positioned on the fixture 10 as shown in FIG. 1. Even before this is done, however, the fixture will have been adjusted to the desired dimension in a manner that will be described so that it will have the desired gage setting distance already in it. This can be done using the subject fixture to an accuracy of about one ten thousandth of an inch or less. Adjusting the gage is then accomplished in two simple steps including a coarse adjustment step which involves adjusting the position of the gaging member 32 in the threaded member 30 and if necessary a fine adjustment step can also be made by adjusting the dial portion 14. The fine adjustment step is accomplished by well known means included on dial bore gages and in the particular gage embodiment disclosed is accomplished by rotating a rotatable scale housing 46 in the upper gaging portion 14. The housing 46 is shown having a serrated outer edge surface 48 which is accessible to the operator for this purpose.

The fixture 10 includes a base 50 having spaced connected pedestal portions 52 and 54 located near the opposite ends thereof. The pedestal 52 is constructed and shaped to receive a block assembly 56 which is constructed and shaped to accurately receive, locate, support and position the gaging end portion 16 of the gage instrument 12 such that the gaging members 24 and 32 extend as shown in FIG. 1.

An accurately preset fixture adjustment member or anvil 58 (FIG. 2) is locked in position in a bore 60 formed in the pedestal 52 by means of a set screw 62 located in another bore 64. The member 58 extends from the bore 60 into an opening formed between upwardly extending portions of the block assembly 56, and the member 58 has a hardened, accurately formed and accurately positioned end surface 66 thereon. The end surface 66 is one of two fixtures setting surfaces and is positioned to engage the end surface 28 of the resilient biased movable gaging member 24 during adjustment or setting of the gage 12, the member 24 being the portion of the gage 12 that operates the movable dial pointer 26 as aforesaid. The location of the surface 66 and the construction of the block assembly 56 are both important because they contribute to the accuracy to which the gage 12 can be set to a desired dimension using the fixture 10.

The block assembly 56 has spaced surfaces 68 formed on the spaced upwardly extending portions 80 and 82 thereof, which surfaces are engageable respectively by the arcuate shaped centering ribs 22 when the gage 12 is in position on the fixture. It should be noted that the centralizer 20 on which the centering ribs 22 are located is movable on the gaging portion 16 relative to the gaging members 24 and 32, and the centralizer 20 itself does not enter directly into adjustment. The ribs 22 are provided to merely center the gaging portion 16 when gaging in a cylindrical bore so that the gaging members will be on the diameter of a bore being gaged and to maintain the members 24 and 32 parallel to the fixture axis when the gage is being set. The ribs 22 as such, however, like the housing on which they are formed do not enter into the adjustment of the gage using the subject fixture 10.

The block assembly 56 is an accurately formed and located assembly provided to accurately position and support the gage 12 when adjusting same. To this end the assembly 56 is constructed to receive and cooperate with the gaging portion 16 of the gage 12 in the position shown in FIG. 1. The block assembly 56 is attached to the pedestal 52 by means of screws 70 and is provided with a pair of spaced upwardly extending positioning pins 72 and 74 located to engage opposite sides of the centralizer 20 and to center and align the gaging members 24 and 32 on the adjusting surfaces of the fixture. When the gage is in this position the movable gaging member 24 is aligned and can be moved into abutment with the fixture surface 66 on the stationary anvil member 58, and the other gaging member 32 is aligned with another fixture surface 76 which will be described. To accomplish this the block assembly 56 must be accurately formed and accurately located on the pedestal 52 and it should also have an accurately formed upper surface or platform 78 on which the gaging portion including the centralizer 20 is positioned and supported. This is necessary because these conditions contribute and help to establish the accuracy to which the gage can be set. The block assembly 56 also includes the similar upwardly extending side portions 80 and 82 on opposite sides of the anvil member 58 on which portions the spaced surfaces 68, which are perpendicular to the axis of the fixture, are formed. The side portions 80 and 82 also connect the platform portion 78 of the block assembly with an integral overhanging ledge 84 which engages the upper surface 86 of the centralizer 20 when the gage 12 is positioned as shown in FIG. 1. The ledge 84 also helps locate the gage during adjustment and further limits movement or tilting of the gage on the fixture. The ledge 84 also makes it easier for the operator to hold and steady the gage in accurate position on the fixture while adjusting it.

The pedestal 54 at the opposite end of the fixture 10 supports a micrometer or micrometer-like assembly 88 which includes a cylindrical member 90 part of which extends through a bore 92 in the pedestal 54 and is locked therein by means of a set screw 94 or similar locking means. The details of the micrometer assembly 88 will be described later.

Positioned on the fixture base 50 between the pedestals 52 and 54 is another block assembly 96 which has a groove or slot 98 formed in its upper portion extending longitudinally therealong in alignment between the spaced fixture adjustment surfaces 66 and 76, the latter of which is adjustable and is located on the micrometer assembly 88. The groove 98 is provided to support and accurately position an optional adjustment extension member 100 of a predetermined selectable length depending on the dimensional distance to be set into the gage 12. A number of different length adjustment members 100 and a corresponding number of different length gage members 32 may be provided depending upon the range of adjustment to be covered. This enables the fixture and the gage to be set to any dimension within a relatively wide range. A special full length extension member (not shown) can also be provided to check the fixture accuracy and to recalibrate the fixture from time to time. Such an extension extends all the way between the fixture surface 66 at one end and the opposed fixture surface 76 located on the micrometer assembly 88 to allow accurate setting of the micrometer to a predetermined known position or dimension for overall calibration purposes. Such a full length extension member may have a length exactly equal to some established dimension such as 7½ inches which corresponds to some particular micrometer setting midway in the range thereof.

A clamping member 102 is pivotally and slidably mounted on a shaft 104 which extends along the rear of the block assembly 96. The clamping member 102 includes a forwardly extending portion 106 which extends out over the groove 98 and is provided to engage the upper surface of any particular selected adjustment member 100 positioned in the groove 98 to prevent the adjustment member from moving or accidentally falling out of the groove. The clamping member 102 can be tilted up on the shaft 104 or slid toward one end of the shaft 104 to open the space above the groove 98 and facilitate installing or removing the selected adjustment extension member 100. Means such as a spring loaded plunger assembly 108 is threadedly positioned in a bore in the member 102 and bears against the adjacent surface of the block assembly 96 to resiliently bias the clamping member downwardly against the member 100.

It can be seen that when one of the adjustment extension members 100 is used, it is positioned in the groove 98 between the fixture gaging surfaces 66 and 76 and in abutment with the surface 76 to take up an accurate predetermined amount of the space therebetween and to extend the accurate useful range of the fixture. When this is done the opposite end of the extension member becomes the second fixture adjustment surface. The only time that an extension member 100 is not required is when the overall dimension between opposite ends or gaging surfaces on the gaging members 24 and 32 is sufficient in itself to span the total distance between the fixture surfaces 66 and 76 within the adjustment range of the micrometer assembly 88 or when the full length fixture calibration extension member is being used as stated.

The block assembly 96 on which the selected adjustment extensions 100 is positioned must itself be located with precision on the fixture base 50 so that the groove 98 accurately positions and aligns the extension member 100. Locating the block 96 is shown accomplished by means of pairs of accurately formed and aligned holes such as holes 110 in the block 96 and holes 112 in the base 50, and pins 114 positioned extending through said holes as shown in FIG. 2. A minimum of two such positioning means are usually required for this purpose. The block 96 is also attached to the base by one or more threaded members such as screw 116.

The micrometer assembly 88 may be of a more or less conventional construction and is shown for illustrative purposes as including a sleeve member 118 which is attached to and made a part of a body or head member 120. The body 120 through the sleeve 118 is threadably attached to an adjustable shaft 122 which includes a reduced diameter end portion 123. The shaft 122 extends through the sleeve 118 and the reduced diameter end portion of the shaft 123 forms the second fixture surface 76. The micrometer body 120 is knurled at 124 to provide means for easily gripping it for rotation, and the body 120 and the shaft 122 are locked to rotate together by means of a smaller diameter knurled member or knob 126 sometimes called a "speeder" knob which is threadably engageable with the shaft 122 and bears against the end of the body 120 to lock the body to the shaft. The smaller diameter of the knob 126 enables it to be rotated by the operator faster than the larger diameter knurled body 120 to increase the speed of making an adjustment. By unscrewing the knob 126, however, the body 120 is released from the shaft 122 and this enables the fixture to be easily recalibrated using the full length extension member as stated. This is an important additional feature which enables the operator to correct errors in the micrometer settings to compensate for wear and other conditions which might occur. The rotatable body 120 also has a scale 128 on it which cooperates with a stationary scale 130 on the member 90 in a manner well known to micrometers.

In order to set the gage 12 using the subject setting fixture 10 an adjustment extension member 100 of proper length for the length gaging member 32 is selected and is positioned in the groove 98. The micrometer 88 is also adjusted to the desired setting by rotating the body 120 or the speeder nut 126 until the movable scale 128 is properly set relative to the stationary scale 130. The distance between the fixture surfaces 66 and 76 is now equal to some fixed known distance such for example as seven inches plus the micrometer setting. With the extension member 100 in position, the fixture setting will be reduced by the amount of the length of the extension member 100. The selected extension member 100 can be placed in the groove 98 before or after setting the micrometer as desired. The selected gage member 32 is now screwed into the member 30 on the gage portion 16. In the first instance it is screwed into the member 30 further than is believed necessary so that the distance between the gaging surfaces 28 and 42 on the gaging members 24 and 32 respectively is intentionally made less than the desired setting. This is done to provide clearance so that the gage can be easily installed in position on the block assembly 56 as described above. When the gage 12 is in position on the block assembly 56 the gaging member 24 is in alignment with and adjacent to the fixture surface 66 and the centralizer 20 on the gaging portion 16 extends under the overhanging ledge 84 and is between the spaced locating pins 72 and 74. The gaging member 32 is now rotated in the threaded member 30 to move it outwardly therefrom to a more extended position. In so doing it moves toward the nearest end surface 132 of the extension member 100. As the member 32 is rotated further it eventually engages and bears against the end surface 132 so that further rotation of the member 32 will first cause the centralizer 20 with its ribs 22 to engage and bear against the surfaces 68 to assure a proper alignment of the gaging members 24 and 32 with the fixture surfaces in this case the surfaces 66 and 132, and secondly after a predetermined movement of the centralizer 20 will cause the plunger 24 to move into engagement with the fixture surface 66 in opposition to resilient means included in the gage to bias it outwardly as aforesaid. As the member 24 is moved into the gaging portion 16 it will operate linkages in the gage which will cause the dial pointer 26 to move relative to the dial face. It is expected that the dial pointer 26 will move up to one full rotation before it is at or near to a zero dial setting position. When this condition is reached, the lock nut 44 will be tightened to lock the position of the member 32 in the member 30 and to complete the setting of the coarse adjustment. It may also be necessary to rotate the scale portion of the dial gage by rotating the scale housing 46 to make the pointer read exactly on zero. This represents the fine adjustment.

After the gage 12 is adjusted as described it is removed from the fixture 10 by first moving it toward the pedestal 52 in opposition to the spring loading on the member 24 and then it is tilted so that the member 32 swings upwardly free of the extension member 100 and finally it is lifted free of the fixture. It is important throughout these steps that all gaging and fixture surfaces as well as the end surfaces of the selected extension member 100 and the groove 98 be clean and free of foreign substances or grease since even small amounts of dirt or grease to some extent may adversely affect the accuracy of the fixture 10 and of the gage setting.

The fixture 10 can also be used to calibrate the scale 134 on the dial portion 14 of the gage 12. This is done by rotating the micrometer body after a gage has been set and while the gage is still positioned on the fixture as aforesaid and by comparing the gage readings with the corresponding settings of the micrometer.

Figure 5:
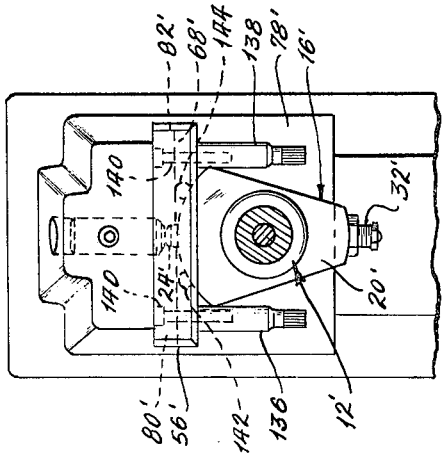
Figure 4:
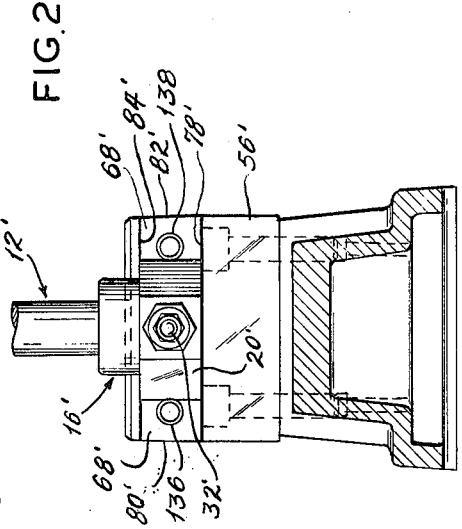
FIG. 4 is a cross-sectional view showing a modified form of the gage receiving and supporting end portion of a fixture similar to the fixture of FIG. 2, said modified fixture being shown with a portion of the gaging end of another form of bore gage positioned thereon; and, FIG. 5 is a top plan view of the modified fixture of FIG. 4.

FIGS. 4 and 5 show a modified form 56' of the block assembly 56 which is specifically designed to accommodate another different form of gage 12' having a different shaped gaging portion 16'. The modified block assembly 56' is similar to the assembly 56 including having a support portion 78' and adjacent wall portions 80' and 82' with surfaces 68' against which the gage 12' is positioned during adjustment. The assembly 56' also has an overhanging ledge 84'. The modified assembly 56' also has two horizontal (rather than vertical) locating pins 136 and 138 mounted on the wall portions 68' thereof to engage opposite sides of the gage housing 20' to locate the same in a manner similar to the way the pins 72 and 74 locate the housing 20 in FIG. 1. The pins 136 and 138, however, are shown as being eccentric so that they can be adjusted to accommodate different width as well as off center gage housing portions. After being adjusted to accommodate a particular gage structure the pins can be locked in position by suitable threaded means 140 which extend through bores in the portions 80' and 82'. The particular gage 12' shown in FIGS. 4 and 5 has a somewhat different construction than the gage 12 but operates in substantially the same way and is used for the same or similar purposes. For example, the gage 12' has opposed and aligned gaging members 24' and 32', and the gage 12' also has two geared together outwardly resilient biased centering pins 142 and 144 which are provided to maintain the gage in proper alignment and to center the gage when it is being used. The centering pins 142 and 144 are used for the same purpose as the centering ribs 22 on the gage 12. Other forms of gages can also be adjusted using the subject fixture and the two gages shown are included for illustrative purposes only.

Thus there has been shown and described a novel setting fixture for adjusting distance measuring devices including particularly dial bore gages and like devices, which fixture fulfills all of the objects and advantages sought therefor. Many changes, variations, modifications and other uses and purposes for the subject fixture will, however, become apparent to those skilled in the art after considering this specification and the accompanying drawings.

What is claimed is:

1. A fixture for adjusting gaging instruments having gaging portions defined by opposed axially aligned gaging members having opposed gaging surfaces thereon, one of said gaging members being adjustable to adjust the distance between the gaging surfaces, said fixture comprising a body member having spaced and connected first and second portions having opposed first and second fixture surfaces thereon, said first and second aligned fixture surfaces having substantially parallel surface portions thereon, gage positioning means on the first body portion including first means for orienting the axis of the aligned gaging members in a first plane extending between said fixture surfaces, second means for orienting the axis of the aligned gaging members in the first plane and in a direction perpendicular to the parallel fixture surface portions, and third means for maintaining the gaging instrument in the predetermined oriented position established by said first and second orienting means, said first fixture body portion including a member having the first fixture surface thereon, said first fixture surface being engageable by one of the gaging surfaces on said gaging instrument to be adjusted when the instrument is in the predetermined oriented position in the gage positioning means, and micrometer adjustment means mounted on the second fixture body portion, said micrometer adjustment means having the second fixture surface thereon for engaging the other of said opposed instrument gaging surfaces for predeterminately adjusting the spacing between said first and second gaging surfaces.

2. The fixture defined in claim 1 wherein said gage positioning means include other means which orient the axis of the aligned gaging members in a position extending between the parallel portions of the said first and second fixture surfaces.

3. The fixture defined in claim 1 wherein said micrometer adjustment means include an extension member having spaced first and second surfaces a predetermined distance apart, and a micrometer member having a surface thereon in abutment with one of the spaced surfaces on the extension member, the other spaced surface on the extension member forming the second fixture surface, and a third body portion positioned between said first and second spaced body portions, said third body portion having means thereon for supporting said extension member in the aforesaid position in alignment axially with the gaging members of the gaging instrument, and means clamping said extension member in position on said third body portion.

4. The fixture defined in claim 2 wherein said other orienting means include two eccentrically rotatable pins extending outwardly from said first body portion to provide adjustable means with which to align the gaging members with the fixture surfaces.

5. Means for setting a gaging instrument having dial indicator means and a gaging portion operatively connected thereto, said gaging portion having opposed gaging members each of which has a gaging surface thereon, the distance between said gaging surfaces being predeterminately adjustable to measure distance, said setting means comprising a fixture having a body including spaced body portions, a first fixture member having a first fixture surface thereon mounted on one of said body portions and engageable with one of the gaging surfaces of the gaging instrument, an adjustable assembly having a second fixture surface spaced from the first fixture surface mounted on the other of said body portions, means for accurately predeterminately adjusting the space between the said first and second fixture surfaces, and means for positioning the gaging portion of the gaging instrument between the said fixture surfaces such that the said gaging members on the gaging portion are aligned extending between the said first and second fixture surfaces, one of the gaging members on the gaging portion being adjustable to make each of said gaging members respectively abut the said first and second fixture surfaces, said adjustable assembly including a rod member of precise predetermined length, said rod member having spaced opposed end surfaces and micrometer means including means engageable with one of the end surfaces of the rod member, the opposite end of said rod member forming the said second fixture surface, and means on said body portion on supporting said rod member in said position in abutment with said micrometer means and in alignment extending therefrom toward the first fixture surface, said means for supporting the rod member including a support member having a rod receiving trough formed therein, and means engageable with said rod member when positioned in the trough to maintain the rod member in said position.

6. The setting means defined in claim 5 wherein said means movable into engagement with the rod member include a rail mounted on said rod support means parallel to the trough therein, a rod engaging member pivotally and slidably mounted on said rail, and means yieldably urging said rod engaging member into engagement with the rod member in the trough.

7. The setting means defined in claim 5 wherein said means for accurately predeterminately adjusting the space between the first and second fixture surfaces include micrometer means.

8. The setting means defined in claim 7 wherein said micrometer means include means to indicate the position of said second fixture surface within a predetermined range.

9. The setting means defined in claim 5 wherein said means for positioning the gaging portion of the gaging instrument include a support table and means on said table for engaging and locating the instrument gaging portion thereon, said positioning means including means to substantially restrict movement of the instrument when positioned on said fixture.

References Cited
UNITED STATES PATENTS

| | | | |
|---|---|---|---|
| 1,617,443 | 2/1927 | Erickson et al. | 33—167 |
| 2,861,346 | 11/1958 | Patterson | 33—167 |
| 2,912,764 | 11/1959 | Spurr | 33—167 |
| 2,933,815 | 4/1960 | Czaplinski et al. | |
| 3,115,705 | 12/1963 | Whitman | 33—167 |
| 3,214,960 | 11/1965 | Nielson et al. | |
| 1,591,259 | 6/1926 | Ames. | |

S. CLEMENT SWISHER, Primary Examiner

U.S. Cl. X.R.

33—167

UNITED STATES PATENT OFFICE
CERTIFICATE OF CORRECTION

Patent No. 3,496,758          Dated Feb. 24, 1970

Inventor(s) Joseph Sunnen

It is certified that error appears in the above-identified patent and that said Letters Patent are hereby corrected as shown below:

Column 2, line 12, "extremly" should be "extremely".

Column 9, line 38, "on" should be "for".

Signed and sealed this 19th day of December 1972.

(SEAL)
Attest:

EDWARD M. FLETCHER, JR.
Attesting Officer

ROBERT GOTTSCHALK
Commissioner of Patents